United States Patent Office 3,274,323
Patented Sept. 20, 1966

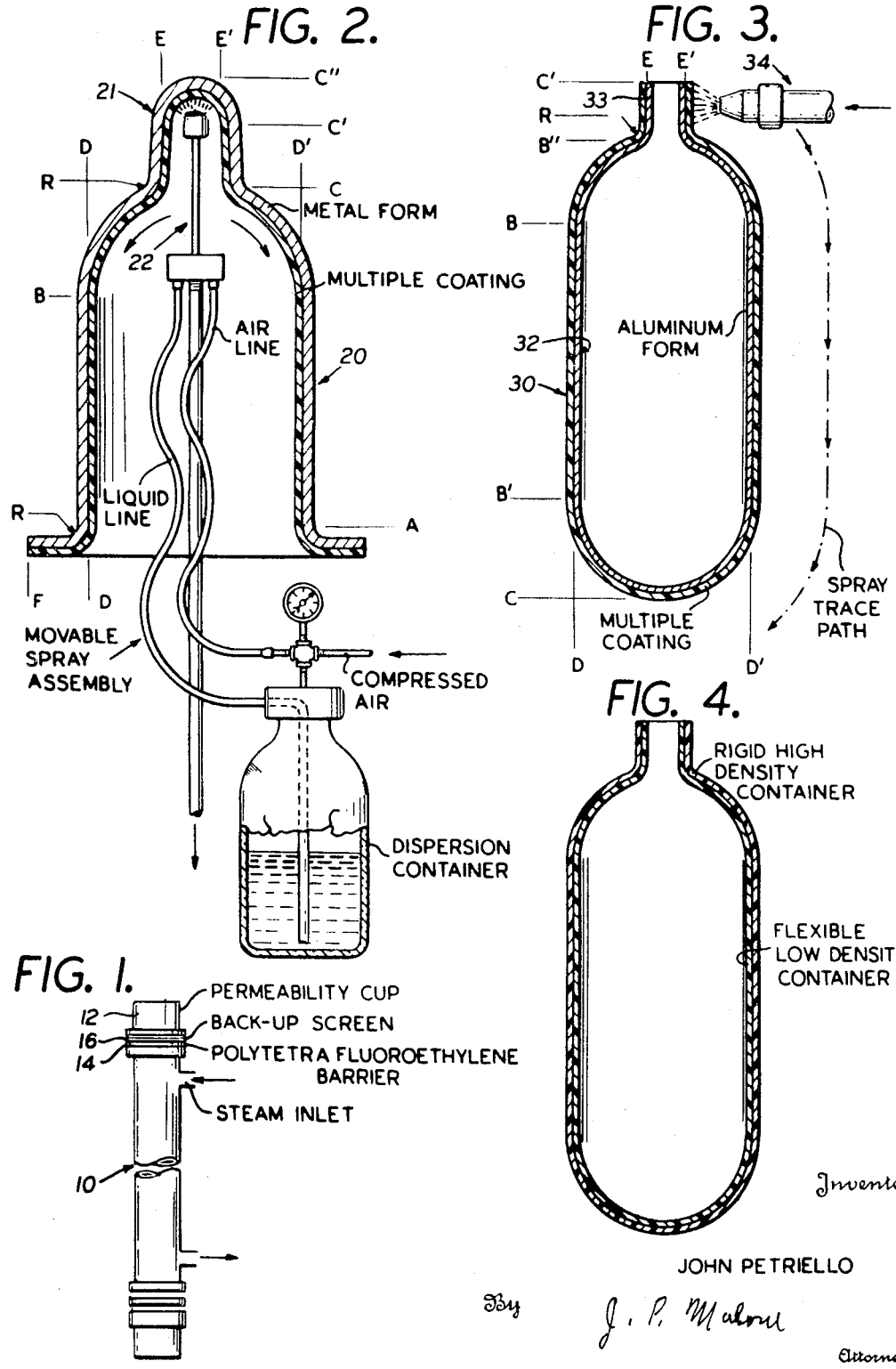

3,274,323
HIGH IMPERMEABILITY COATINGS AND SUPPORTED FABRICATED OBJECTS OF POLYTETRAFLUOROETHYLENE
John Petriello, North Babylon, N.Y., assignor to Dilectrix Corporation, Farmingdale, N.Y.
Filed May 3, 1962, Ser. No. 192,213
3 Claims. (Cl. 264—308)

This invention relates to high impermeability coatings and films of polytetrafluoroethylene having particular merits for use in corrosive chemical services. More particularly, this invention relates to the improved process for making highly impermeable, pore-free, non-blistering coatings and films for handling, transfer, and storage of highly chemically reactive and unstable fuels.

These coatings and films are made of fused or baked poytetrafluoroethylene which is a chemically inert, thermally stable, non-adhesive polymer. These coatings and films are applied from the dispersed form of the polymer having suspended particles appreciably less than 1 micron as described in Industrial and Engineering Chemistry, volume 44, pages 1800–1805, 1952, using water as the suspending medium and a surfactant to stabilize the dispersion. The polytetrafluoroethylene can be spread onto metal surfaces or substrates either by dipping, spraying or by electrodeposition in limited layers, that is not in excess of the critical thickness described in the above article, following by careful drying to remove the water and then fusing or baking above the 327° C. transition temperature, repeating the spreading, drying and baking operations until the desired thickness is attained. A detailed description of this repetitive coating process, or multiple-dip operation, is given in my United States Patent No. 2,852,811, issued September 23, 1958. However, while the multiple layering process is currently being used in the industry to produce coatings for chemical-ware, there is an increasing need for even more highly uniform and impermeable protective coatings to prevent stored fluids or gases from passing through the coatings or through isolated non-supporting fabricated items and thereby causing damage to chemically-nonresistant components and serious leakage.

It is the object of this invention to provide a highly uniform, impermeable, non-porous and non-blistering protective coating of the character described, and a method and means of making and applying same.

Another object of this invention is to provide a completely pore-free or voidless fused multiple coating that will withstand steam permeation and blistering in high pressure, alternating cycling high temperature and low temperature services.

Another object of this invention is to provide the characteristics that will assure superior coatings and fabricated forms.

A still further object is to provide multiple-cast or sprayed supported containers and shapes sintered to a critical minimum fused density with improved impermeability and resistance to blistering on exposure to penetrating fluids.

It is a further object to provide the baking or fusion procedures for circumventing the undesirable permeation of liquids and gases to which the coatings or films of polytetrafluoroethylene are exposed.

It is well established that permeation or diffusion of gases and liquids through organic substrates results from internal defects such as voids or pores. It has been discovered that the baking or fusion of polytetrafluoroethylene applied as multiple castings or sprayings leaves a considerable number of microscopic and submicroscopic pores, that is to say not generally visible optically under high magnification and substantially lower than one-tenth of a micron, resulting in relatively high permeation rates. It is also well established that crystalline content is a factor in the permeation and diffusion of gases and liquids through organic polymers. For instance, films of cellulose and its derivatives having a crystalline structure when dry are generally impermeable to gases, as pointed out by Barrer (Transactions of the Faraday Society, volume 36, page 644, 1940), whereas amorphous rubber films are permeable. Such highly permeable films, when applied as coatings on inorganic substrates, generally lead to the accumulation of diffused entrapments of vapors and liquids which eventually cause separation of the coating layer. In the case of multiple coatings of polytetrafluoroethylene a similar defect is observed with coatings having a preponderance of amorphous content. Furthermore, if the fusion between the multiple coatings is incomplete there will result an intra-coating or inter-laminar separation that starts from submicroscopic blisters and progresses to blisters that extend over several square inches after exposure to elevated temperatures in the environment of liquids and gases. The present invention is based upon the discovery of the critical physical and molecular structure that will assure new and improved coatings and self-supporting structures, notably containers for highly corrosive chemicals and high energy, highly reactive rocket fuels.

The invention is illustrated in the accompanying drawing, in which:

FIG. 1 is a schematic view of steam permeability test apparatus as utilized herein, the test results being shown in Table I-B of Example 1.

FIG. 2 is a sectional view of a stainless steel reaction vessel coated internally in accordance with baking schedules II and IV of Example 1.

FIG. 3 is a sectional view of an aluminum vessel coated externally in accordance with schedule IV of Example 1.

FIG. 4 is a sectional view of a composite container having an inner, relatively flexible lining of coating IV-C and an outer, relatively stiff coating IV-E, both of Example 3.

EXAMPLE 1

A 12-inch by 12-inch by 0.060-inch thick commercial stock of schedule 2S aluminum plate is given four series of 20 spray-coatings of 58 percent solids aqueous dispersion of "Teflon" 30 tetrafluoroethylene resin (produced by E. I. du Pont de Nemours & Co.) stabilized to a 6 percent level of "Triton X–100" (produced by Rohm & Haas Co.), a non-ionic surfactant chemically constituted as an alkylaryl polyether alcohol, a formulation described in Industrial and Engineering Chemistry, volume 44, page 1802, 1952. These series differ essentially in the dwell time at the baking temperature to illustrate what I have discovered to be a critical schedule to give rise to a uniform multiple-coat polymer composition. All sintering schedules were carried out at 385–390° C., using a commercial air-circulating oven in which the coated aluminum plate was suspended by means of a hook attached to a single hole at the top center of the plate. Each of the 20 spray-coatings of the four-membered series was given 1, 2, 3 and 5 minutes baking time except the last, 20th coating, which was given a 10 minute baking schedule as the final treatment followed by cooling to 275° C. at a rate of 10–20° C. per minute. The resulting coating was used along with representative commercial coatings chosen at random to compare quality with respect to endurance against steam, hydrogen peroxide, and hydrazine permeation as described in the ensuing details. Small stripped sections of these four preparations along with random commercial samples showed the following characteristics:

The above test conditions employin ga non-bonded barrier of a multiple coat of polytetrafluoroethylene that is non-bonded to a metal substrate, provide a useful discriminating method for demonstrating the contiguity of

*Table I*

CRITICAL CHARACTERISTICS OF MULTIPLE COATINGS

| Characteristic Property | Coatings of this Example | | | | Commercial Samples | | |
|---|---|---|---|---|---|---|---|
| | I | II | III | IV | A | B | C |
| (1) Accumulated baking schedule, minutes | 29 | 48 | 67 | 105 | (Undetermined) | | 17.1 |
| (1a) Thickness, mils | 16.6 | 16.4 | 16.2 | 16.1 | 16.0 | 16.3 | 17.1 |
| (2) Density (23.0° C.), gm./cc | 2.181 | 2.173 | 2.161 | 2.156 | 2.176 | 2.172 | 2.175 |
| (3) Specific gravity (23/23° C.) | 2.186 | 2.178 | 2.166 | 2.161 | 2.181 | 2.177 | 2.180 |
| (4) Crystalline content, percent | 62.5 | 61.0 | 59.5 | 57.5 | 62.0 | 61.0 | 62.0 |
| (5) Yield strength, lb./sq. in | 1,540 | 1,600 | 1,680 | 1,700 | 1,560 | 1,540 | 1,500 |
| (6) Tensile strength, lb./sq. in | 2,800 | 3,400 | 3,740 | 4,400 | 2,790 | 2,800 | 2,740 |
| (7) Yield elongation, percent | 48 | 51 | 56 | 62.5 | 46 | 49 | 44 |
| (8) Tensile elongation, percent | 340 | 430 | 470 | 640 | 350 | 380 | 360 |
| (9) Modulus, tensile, lb./sq. in | 72,000 | 70,000 | 62,000 | 59,000 | 71,400 | 68,000 | 69,000 |
| (10) Permeation, gm./100 sq. in./mil/atm./24 hours: | | | | | | | |
| (aa) Water, 23° C | 3.0 | 1.2 | 4.5 | 0.82 | 4.4 | 3.8 | 6.8 |
| (a) Steam-108–110°C | 7.4 | 6.8 | 6.6 | 1.2 | 7.2 | 7.8 | 9.2 |
| (b) Hydrogen peroxide, 23° C | 2.4 | 0.6 | 1.2 | 0.78 | 3.2 | 3.6 | 4.1 |
| (c) Sym-dimethylhydrazine, 23° C | 2.8 | 0.9 | 1.1 | 0.79 | 3.4 | 4.6 | 5.7 |
| (11) Pore volume from moisture absorption, percent | 1.8 | 1.2 | 0.34 | 0.03 | 2.1 | 2.1 | 2.3 |

The density measurements (2) were made pycnometrically using benzene as the immersion fluid to ensure complete wettability. The crystalline content is assigned on the basis of the specific gravity (3), determined also from the benzene volume displacement dependence on crystallinity shown in FIGURE 1 in the article published in the Society of Plastics Engineers Journal, volume 12, Number 6, page 90, June 1956 issue. The tensile properties, items (5) to (9) inclusive, were determined by the method prescribed in the American Society for Testing Materials Method D–412–C. The water permeability (10a) was determined by the method similar to that described by Morgan in the Industrial and Engineering Chemistry, volume 45, page 2296, October 1953; the same technique was used for hydrogen peroxide (10b) and for symmetrical dimethylhydrazine with slight modifications in the sealing technique, in that threaded lock retainer flanges were used in lieu of the sealing wax. The steam permeability measurement was carried out with a standard 2-inch steam pipe 10 employing a "blind" flange and cup arrangement as shown in FIGURE 1 of the present drawing, with a low pressure steam source adjusted to a temperature of 108–112° C., using 24-hour test run to determine, by usual weight increase in cup 12, the amount of steam vapor permeated through the polytetrafluoroethylene barrier 14, supported with 16-mesh stainless steel spacer 16. This test has been particularly illuminating with regard to the contiguity or completeness of the baking or fusion effected especially under the conditions leading to coating IV and at the same time the test revealed the inadequate baking of coatings I and II and the three commercial coatings A, B, C by the development of blistered, microscopically small delaminations as shown by the following tabulation:

the multiple applications of the coating and also illustrate the importance of adequate baking particularly for non-supported or non-substrated coatings described in one of the succeeding examples.

As a result of the above performance in steam service, I have attempted to determine the underlying basis for this discovery using the density values in Table I as a possible clue. It will be seen that in progressing from Series I to IV two significant changes in the property characteristics take place as shown in above Table I: namely (1) the density surprisingly decreases with increase in the accumulated baking schedule, and (2) the pore volume (11) decreases correspondingly as measured by equilibrium absorption isotherms using the technique and microbalance of the type described by Prager and Long in the Journal of the American Chemical Society, volume 73, page 4072 (1951) and also by Rogers and co-workers as described in the Journal of Physical Chemistry, volume 63, page 1048 (1959). While these two opposing effects seem inconsistent—that is, decrease in density with the increase in baking time—the explanation lies in the fact that initially the polymer is substantially (about 95 percent) crystalline when applied from the dispersion. Baking above the melting point of 327° C. proceeds to melt away the crystalline structure, while at the same time the fusion takes place. Evidently, the fusion is a time-dependent phenomenon that requires more than a mere matter of a minute or so. As I propose to explain the superior quality in coating IV, the 5-minute intermittent baking and the accumulated 105 minute baking schedule gives sufficient time to dissolve away the initial dispersion crystallinity, while the consolidation and inter-laminar fusion proceed to completion. Baking periods less than 5 minutes under the temperature environ-

*Table I-B*

STEAM VAPOR PERMEATION AND BLISTER FORMATION
Test Procedure: "Blind" flange installation as in Figure 1.
Test Conditions: 96 hours at 108–112° C.

| Description | Coatings of This Example | | | | Commercial Samples | | |
|---|---|---|---|---|---|---|---|
| | I | II | III | IV | A | B | C |
| (1) Accumulated baking schedule | 29 | 48 | 67 | 105 | (Undetermined) | | |
| (2) Steam permeation, gm./100 sq. in./mil/atm | 44.5 | 34.0 | 26.8 | 4.1 | 56.7 | 62.3 | 100 (leaked) |
| 3) Blister count, no./sq. in. (adjusted) | 9 | 11 | 3 | 0 | 14 | 17 | 7 | ment used in Example 1 give rise to partial or incomplete fusion, and this in turn will show up in the inordinately high permeation rate and propensity to produce blisters under the steam service test described above. It is evident that the three commercial samples A, B and C are not based upon the discovery of improved, highly impermeable multiple-coating structure, as comparative data in above Table I-B clearly indicates.

Independent evidence that the improved coating IV of the above example is uniquely different from its predecessors, particularly I and II and the commercial samples A, B and C, is evident from X-ray diffraction patterns comparing them with the unbaked dispersion polymer. The principal and secondary crystal lattice lines of the unbaked polymer provide a clue to the marked difference between coating IV and its predecessors which retain to a discernible degree structural similarity to the original polymer. Similar analysis of commercial samples A, B and C reveal close resemblance to coatings I and II which are clearly inferior to coating IV. It is thus apparent that a coating fused to eliminate all vestiges of the order in the dispersion polymer is a necessary requisite to yield inter-laminar fusion for a highly impermeable fused structure.

EXAMPLE 2

A stainless steel reaction vessel 20 with sand-blasted, roughened interior surface of the general design shown in FIG. 2 was coated according to the baking schedules II and IV in Example 1. The principal dimensions of the vessel are:

| | Inches |
|---|---|
| Internal diameter D–D' | 24 |
| Straight side length A–B | 20 |
| Principal dome length B–C | 12 |
| Extension well diameter E–E' | 6 |
| Extenison well side length C–C' | 6 |
| Extension well dome length C'–C" | 6 |
| Flange length F–D | 2 |
| Radial curvature R—interior side, radius | ½ |
| Overall vessel thickness | 0.060 |

For the coating operations, the well-extension 21 was clamped in a centered turning chuck attached to an electrically-driven motor capable of providing variable turning speeds of 6 to 24 revolutions per minute. A dispersion-spray attachment 22 guided on a predetermined track is installed in the internal portion of the roughened vessel and made to traverse from the innermost well region to the outermost flanged region with the spray nozzle directed normally to the surface. For improved adhesion to the interior of the vessel, a pretreatment of the surface with a 2 percent aqueous solution of sodium mono-hydrogen ortho-phosphate is applied optionally. Each coating is applied from a 58 percent aqueous dispersion of "Teflon" tetrafluoroethylene resin adjusted to 9 percent "Triton" content at a spray load to produce between 0.0008 and 0.0010-inch coating between each baking operation. The baking operation is carried out in an air circulating oven providing a controlled temperature within the limits of 380 and 385° C. at the interior coating regions, while the vessel is slowly rotated at approximately 6 to 12 revolutions per minute in the oven to assure even baking. An auxiliary duct of circular 2-inch diameter stainless steel (16-gauge) is introduced at a slight possible air pressure (also at 380 to 385° C.) to aid in the removal of the volatilized "Triton" X–100 and its decomposition residues. Twenty separate coatings are applied to form a 16 to 17 mil coating. The resulting coating constructions were placed into service in the mixing of corrosive reagents, including hydrogen fluoride, for various organic preparations. From among a series of such coated vessels, sacrificed sections were examined for density, porosity and steam permeation, using cut-off sections of the well extension 21 attached to the steam permeability tester at the permeability cup 12 in FIG. 1 and using special gasketing to provide a leak-proof fit. The critical data and permeability results are summarized in the following table:

Table II
CRITICAL CHARACTERISTICS OF SCHEDULE II AND IV COATINGS (SECTIONED)

| Description | Coating II | Coating IV | Coating IV-B |
|---|---|---|---|
| (1) Accumulated baking schedule, minutes | 48 | 105 | [1] 165 |
| (2) Density, 23.0° C., gm./cc | 2.183 | 2.165 | 2.167 |
| (3) Pore volume from moisture absorption, percent | 1.5 | 0.035 | 0.031 |
| (4) Steam permeation rate (108–112° C.), gm./100 sq. in./mil/atm./96 hrs. (A–B section) | 9.6 | 0.14 | 0.03 |
| (5) Steam permeation, blister number/sq. in. exposed to well area (96 hrs.) | 1 | 0 | 0 |

[1] In this case the 20th coating was given a 70 minute baking schedule. In the above coatings a different lot of "Teflon" 30 tetrafluoroethylene resin dispersion was used which may account for the slight variability compared to the actual data shown in Example 1. The performance again emphasizes the importance of this invention in providing a well-characterized multiple-spray coating composition, as it is obvious that Coating Schedule II is inferior to Coating Schedules IV and IV-B.

EXAMPLE 3

A self-supporting container 30 of multiple-spray construction of polytetrafluoroethylene was prepared in a manner reversing the application described in Example 2 above, namely by spraying a pre-formed aluminum form 32 of the general design shown in FIGURE 3, having a thickness of 0.025 to 0.050 mils, and the following dimensions:

| | Inches |
|---|---|
| External diameter D–D' | 12 |
| Vessel, overall length C–C' | 36 |
| Cylinder length B–B' | 24 |
| Shoulder length, top B–B" | 6 |
| Dome length, bottom B'–C | 6 |
| Inlet neck length B"–C' | 6 |
| Inlet neck diameter E–E' | 4 |
| Radial curvatures R, exterior side | ½ |

The aluminum form 32 is centrally clamped by means of a support mandrel attached to the internal portion of the inlet neck 33 and continued to the dome bottom to assure concentrically even rotation, as in the case of Example 2 with the spray-coating operation. A traversing spray nozzle 34 moving along a predetermined path with appropriate automatic controls to assure uniform application is provided for as shown generally in the FIGURE 3. Each coating is applied from a 58 percent aqueous dispersion of "Teflon" 30 tetrafluoroethylene resin adjusted to 9 percent "Triton" X–100 content at a spray load to produce between 0.0008 and 0.0010-inch coating between each baking operation. The baking operation is carried out in an air-circulating oven designed to provide a temperature control within the limits of 380 and 385° C. to the coated form suspended from the inlet by means of internally positioned hooks. A total of 20 coatings were made according to Coating Schedule IV of Example 1 with three different cooling rates as indicated in the ensuing Table III. Following the completion of the accumulated baking and supplemental cooling schedules, the aluminum form was dissolved away by immersing completely in 20 percent sodium hydroxide solution, care being exercised to provide adequate ventilation against possible explosive hazard due to the evolution of hydrogen gas. These containers were made purposely for the storage of corrosive and reactive chemicals that include hydrogen fluoride, fuming nitric acid, concentrated hydrogen peroxide (95 and 98 percent and higher) and unsymmetrical-dimethylhydrazine and anhydrous hydrazine, the last three named representing typical rocket fuels. The physical constants of the self-supporting multiple-coated containers used for these services are tabulated as follows, based on tests with excised sections:

Table III
CRITICAL CONSTANTS OF MULTIPLE COAT CONTAINERS

| Description | Coating IV-C | Coating IV-D | Coating IV-E |
|---|---|---|---|
| (1) Accumulated baking schedule, minutes | 105 | 105 | 105 |
| (2) Cooling rate (380° to 275° C.), degrees/minute | 50–100 | 10–20 | 2.5–5.0 |
| (3) Density (23.0° C.), gm./cc | 2.132 | 2.160 | 2.172 |
| (4) Pore volume from moisture absorption, percent | 0.054 | 0.031 | 0.030 |
| (5) Steam permeation rate (108–110° C.) gm./100 sq. in./mil/atm./96 hrs | 0.26 | 0.15 | 0.08 |
| (6) Hydrogen peroxide permeation, gm./100 sq. in./mil/atm./24 hrs | 0.0160 | 0.0091 | 0.0090 |
| (7) Hydrazine permeation rate, gm./100 sq. in./mil/atm./24 hrs | 0.0336 | 0.0136 | 0.0034 |

The above data indicate a marked improvement at the slower cooling rate which in turn gives rise to a higher density and thus a higher crystalline content with corresponding decrease in permeation rate. As the density increases, the stiffness increases correspondingly. For double protection, the more flexible coating IV-C has been used as an inner liner or insert inside of the more dense and more stiff coating IV-E to give a composite container such as shown in FIG. 4; the insertion can be made readily by pre-heating the coating IV-C in 100° C. which reduces the stiffness appreciably to allow for easier insertion.

In this specification, I have demonstrated that the basic fused characteristics of polytetrafluoroethylene require certain critical property features, namely (a) complete dissolution of the initial polymer crystallinity which is concomitant with complete fusion, (b) high density or high crystalline content without embrittlement as is the case when the crystallinity exceeds 75 percent, and (c) substantially zero pore volume which I have indicated by a relative test that undoubtedly includes some surface absorption yet emphasizes the marked reduction in pore content when the baking schedules I have described are followed closely.

It will be understood that numerous modifications may be made in the specified polymer characteristics, including density ranges higher than those indicated through extended baking schedules, which will to some degree be dependent upon the quality of the initial dispersed form of polymer supplied by the vender, and yet be encompassed within the suggested ramifications of my procedures. Having thus fully described the characteristics of the baked polymer as a composition of matter, its critical processing conditions, and novel shapes for storage and handling of reactive chemicals, I claim:

1. A process for producing a highly impermeable multilayer structure of fused polytetrafluoroethylene comprising the steps of baking each successive layer for a minimum of 5 minutes at the temperature of 380 to 385° C., followed by a final baking time of minimum of 60 minutes, and a maximum cooling rate to ambient conditions of 20 degrees centigrade per minute.

2. A self-supporting container comprising a fused polytetrafluoroethylene structure made according to the process of claim 1.

3. A method of producing a highly impermeable laminated film of polytetrafluoroethylene, comprising the steps of forming from substantially crystalline polytetrafluoroethylene in dispersion a plurality of superimposed layers, each layer being less than one mil in thickness and baking after each of said layers is deposited, for at least five minutes at a temperature above the melting point of the polymer to melt away the initial dispersion crystallinity while fusing the several layers together.

References Cited by the Examiner
UNITED STATES PATENTS
2,520,173   8/1950   Sanders.
2,710,266   6/1955   Hochberg.

OTHER REFERENCES
Du Pont Information Bulletin No. X–50d, "Teflon 30 Aqueous Dispersion-Properties and Processing Techniques," E. I. du Pont de Nemours and Co., Wilmington, Delaware, June 1957, 6 pgs.

ALEXANDER H. BRODMERKEL, *Primary Examiner.*

MORRIS LIEBMAN, ROBERT F. WHITE, *Examiners.*

A. L. LEAVITT, F. S. WHISENHUNT,
*Assistant Examiners.*